United States Patent [19]
McKenzie et al.

[11] 3,889,225
[45] June 10, 1975

[54] SONAR DISPLAY

[75] Inventors: George J. McKenzie, Milton, Ontario; Heinz W. Ruther, Mount Hope, Ontario, both of Canada

[73] Assignee: Westinghouse Canada Limited, Hamilton, Ontario, Canada

[22] Filed: Aug. 9, 1973

[21] Appl. No.: 386,881

[52] U.S. Cl. .............. 340/3 C; 315/367; 343/5 DP
[51] Int. Cl. ........................... G01s 7/56; G01s 7/62
[58] Field of Search ........ 340/1 R, 3 R, 3 C, 324 A, 340/366 CA; 343/5 DP, 5 EM; 315/24

[56] References Cited
UNITED STATES PATENTS

| 3,060,427 | 10/1962 | Jaffe et al. ...................... 340/324 A |
| 3,751,712 | 8/1973 | Murray ............................... 315/24 |
| 3,761,928 | 9/1973 | Greutman .......................... 343/5 DP |
| 3,794,993 | 2/1974 | Christopher ....................... 343/5 DP |

*Primary Examiner*—Richard A. Farley
*Attorney, Agent, or Firm*—Westinghouse Canada Limited

[57] ABSTRACT

A PPI display system for sonar is based upon a digital clock. This constant reference is used to generate analog values for the deflection of the PPI display tube. The arrangement adds particular convenience to the adjustment of range in response to temperature, orientation of display with respect to north calibration of various cursors and the generation of cursors.

2 Claims, 6 Drawing Figures

10

3,889,225

1
SONAR DISPLAY

This invention relates to PPI displays for sonar. It will be understood that the sonar system includes in general a transmitter and receiver, the transmitter radiating energy in different directions and the receiver receiving any energy that is reflected back from objects illuminated by the transmitter. The return signals are then displayed on a suitable display device.

One of the most convenient forms of display consists of a plan position indicator in which the information is displayed in the form of signals on the face of a cathode ray tube where the angular position of the signal relative to the centre of the tube indicates the direction of the object illuminated by the transmitter and the radial distance from the centre of the tube to the signal represents the radial distance of the object from the transmitter. In order to produce this sort of display it is necessary to deflect the beam of the cathode ray tube from its centre position with an outward direction having a velocity representative of velocity of sound through water. The beam must also be deflected in a circular manner for example by applying sinusoidal and co-sinusoidal waves to the deflection circuit so that the rotational position of the beam about its centre represents the rotational position of the receiver beam relative to the source or ship where the transmitter is located.

It is common practise in association with such displays to incorporate a cursor which may be moved by the operator over the face of the display. This cursor may consist of a signal applied to the cathode ray tube causing brightening for example. Location of the end portion of the cursor over a signal of interest by manual means permits range and/or bearing to be read out from a numerical display. In order to produce an absolute reference within the system it is also useful to correlate the display to some fixed reference for example, the top of the display may be consistently the ship heading or if desired it may be the magnetic heading or some other fixed reference which will enable a true appreciation of the relative position of the ship and the object being viewed.

It will be understood that in order to produce all the various foregoing facilities within the display it is necessary to generate certain interrelated voltages and signals whose analog values represent range, direction etc. Some of these analog values will vary in accordance with the ambient conditions for example the velocity of sound in water which is a function of the temperature and salinity of the water.

In accordance with the present invention all the various required voltages are based upon a digital count derived from a master clock and those which vary in accordance with the ambient condition are corrected by means of a variable clock subject to the ambient adjustment.

A clearer understanding of our invention may be had from the following description in drawings in which.

Figure 2:
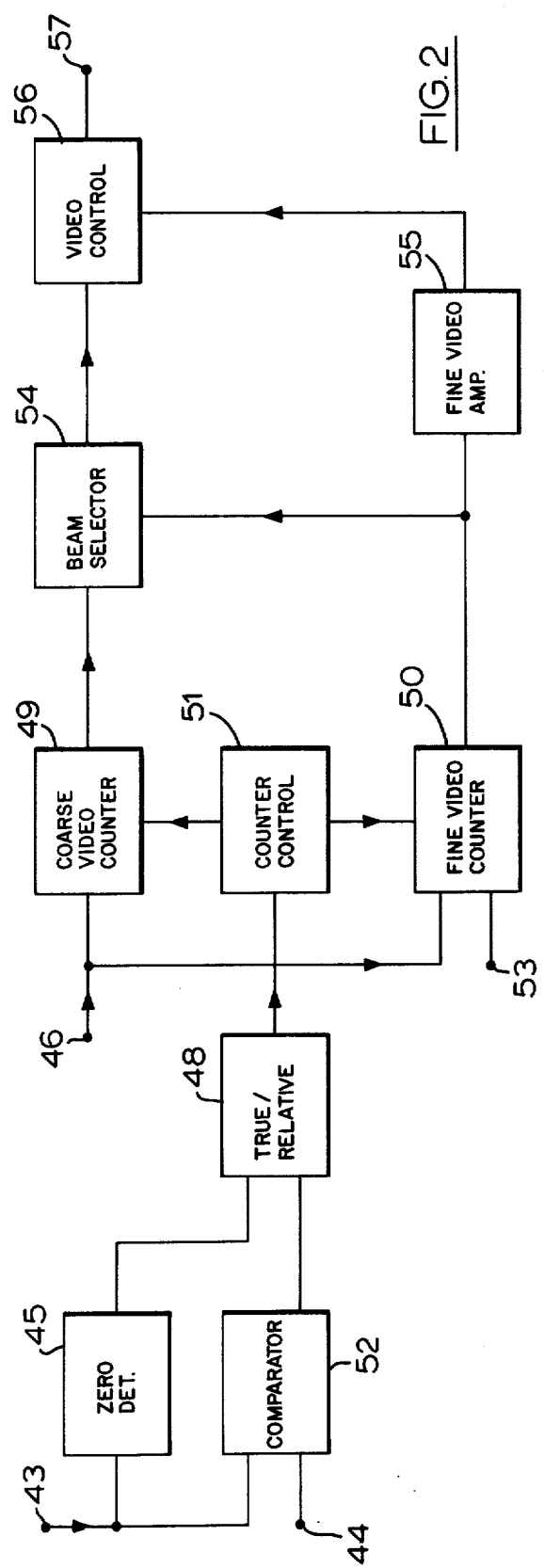
FIG. 2 is a block diagram of a further portion of the system of FIG. 1.
Figure 6:
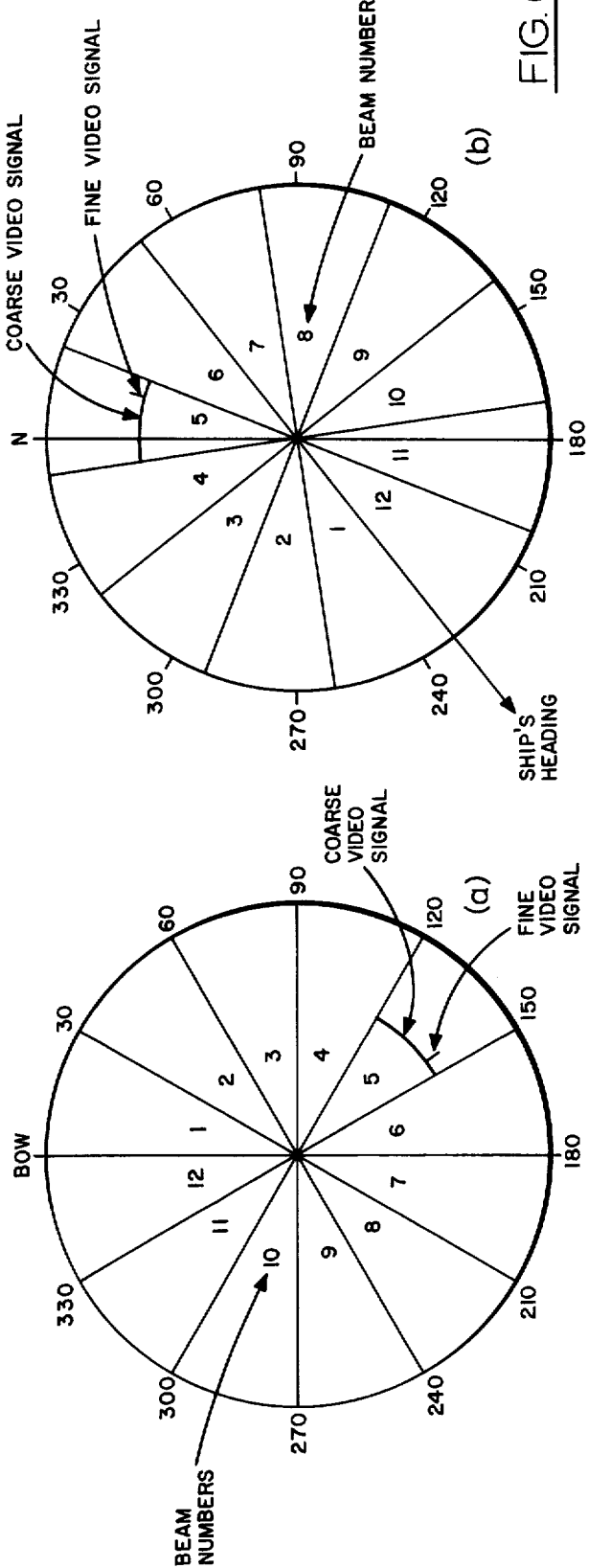

2
FIG. 6 on the same sheet as FIG. 2, illustrates the form of display on the PPI tube.

Figure 1:
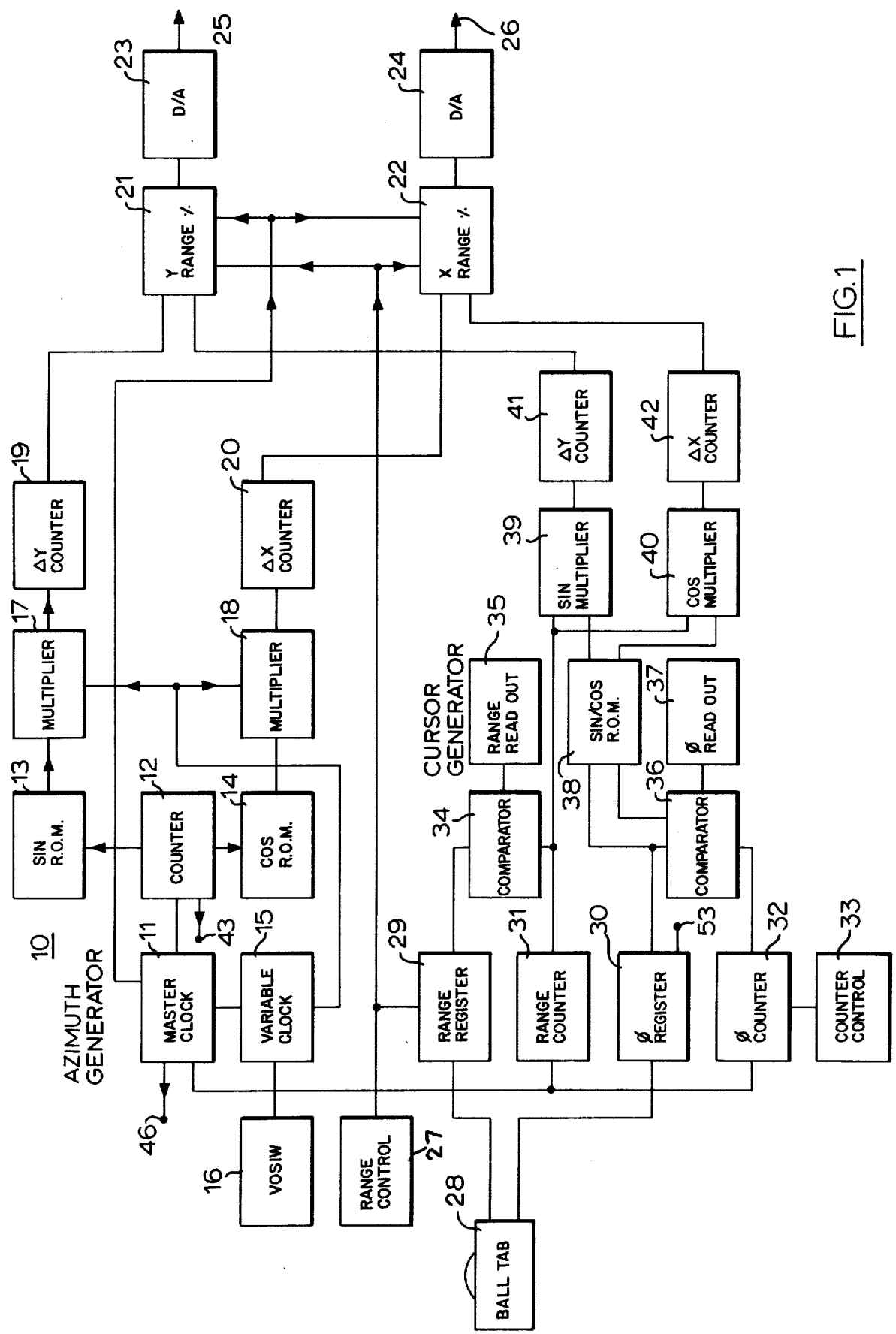
FIG. 1 is a block diagram of a portion of a display system in accordance with our invention.

Considering first FIG. 1 there is shown a single line simplified block diagram of a portion of the display system. It is assumed that the outputs shown at the right-hand side of the drawing are applied to suitable control portions of the actual cathode ray tube display. The necessary voltage supplies and deflection generators, etc., as required by the cathode ray tube are not shown since they are familiar to one skilled in the art.

Considering the upper portion of FIG. 1 there is shown the components used to produce the X and Y deflections of the cathode ray tube beam for PPI display. This section is referred to as the azimuth generator and is designated 10. As will be seen within this block 10 there is included a master clock 11, a counter 12 which counter drives two read only memories, one which generates a count proportional to a sinusoidal value designated 13 the other of which generates a count representative of co-sinusoidal value designated 14. A variable clock 15 is also driven by the master clock. The output from this clock is proportional to the corrected velocity of sound in water which is corrected in accordance with the ambient temperature, salinity etc. For this purpose a manually adjustable VOSIW switch designated 16 is coupled to the variable clock. The resultant output, which is in the form of a corrected count, is applied to the multipliers 17 and 18. The outputs from the multipliers 17 and 18 are applied to a pair of counters the delta Y counter designated 19 and the delta X counter designated 20. The output from these counters is applied to range dividers in each case designated 21 and 22 respectively and the resulting counts are applied to digital-to-analog converters 23 and 24. The range dividers are controlled by signals from the master clock 11 and from the range control 27. The outputs from these digital-to-analog converters which appear on terminals 25 and 26 are used to control the X and Y deflection of the cathode ray tube in the display device.

Operation of the Azimuth Generator

The master clock 11 produces a series of pulses at a fixed rate determined with great accuracy. The output from the master clock 11 is applied to the counter 12 which counts up to a set number which represents one complete revolution of the display and then resets to zero producing as it does so a zero count signal. The count from the counter 12 is applied to two read only memories. Considering only one portion of the system for example the Y deflection the counter 12 has an output which is applied to the sine read-only-memory designated 13 and the output from the sine read-only-memory which is a pulse count representative of the sinusoidal value is applied to the multiplier 17. At the same time the variable count from variable counter 15 is applied to the multiplier 17. This variable count has been adjusted to represent range in accordance with the velocity of sound in water as selected by the switch 16. The two counts are multiplied together in 17 and produce a delta Y output which is applied to the delta Y counter 19. For one complete cycle of the counter 12 the input from the variable counter 15 to the multiplier 17 will be a given value, thus producing a delta Y count which represents a sinusoidal value of a given maximum amplitude. For the next cycle of counter 12 the output from variable counter 15 will be a greater number thus producing a sinusoidal output from multiplier 17 which is of greater amplitude. The difference between the first count and the second count will, as has been indicated previously be in a proportion to the velocity of sound in water. This delta Y count is applied to the Y range divider 21 and here the count is adjusted in accordance with the desired maximum range to be displayed on the display tube. The operation may be clarified by considering the output from the range divider 21 which is applied to the digital-to-analog converter 23. Since a given count from the range divider always produces the same analog output at terminal 25 and since a given analog output at terminal 25 produces a full deflection of the cathode ray tube it will be evident that by changing the count input to the digital-to-analog converter, by changing the division, the rate at which the maximum deflection is obtained is dependent upon the signal from the range control 27 which changes the rate of division by the range divider 21. If for example divider 21 divides by 2 the full scale deflection of the cathode ray tube will represent twice as many master clock pulses, or twice the time which is equivalent to twice the range.

The operation of the delta X portion of the azimuth generator is identical to the delta Y portion and will not be described.

Considering the lower portion of FIG. 1 there is shown the cursor generator. The cursor generator is intended, of course, to generate an indication of the range and bearing of a desired target by means of producing a mark on the display adjacent the desired target and at the same time producing a readout which indicates the position of the cursor. To this end there is provided a ball tab 28. The ball tab produces a cound which is applied to the range register 29 and the theta or angle register 30. An output from the master clock 11 is applied to a range counter 31 and to an angle counter 32. The start of the angle counter 32 is determined by the counter control 33. The output from the range register and range counter are both applied to comparator 34 and when they are identical an output occurs which produces a readout on the range readout display 35. Similarly the outputs from the angle register and the angle counter are applied to comparator 36 and when they are identical a theta readout is provided at the visual theta readout 37. An output from the theta register and from the comparator is applied to a sine/cos read only memory 38. The sine and cos output of this memory are applied to multipliers 39 and 40. Also applied to these multipliers 39 and 40. Also applied to these multipliers is the output from the range counter 31. The resultant from the multipliers 39 and 40 is applied to delta X and delta Y counters 41 and 42 respectively. The output from these counters is applied to range dividers 21 and 22 and from thence to digital-to-analog converters 23 and 24.

Operation of the Cursor Generator

Figure 3:
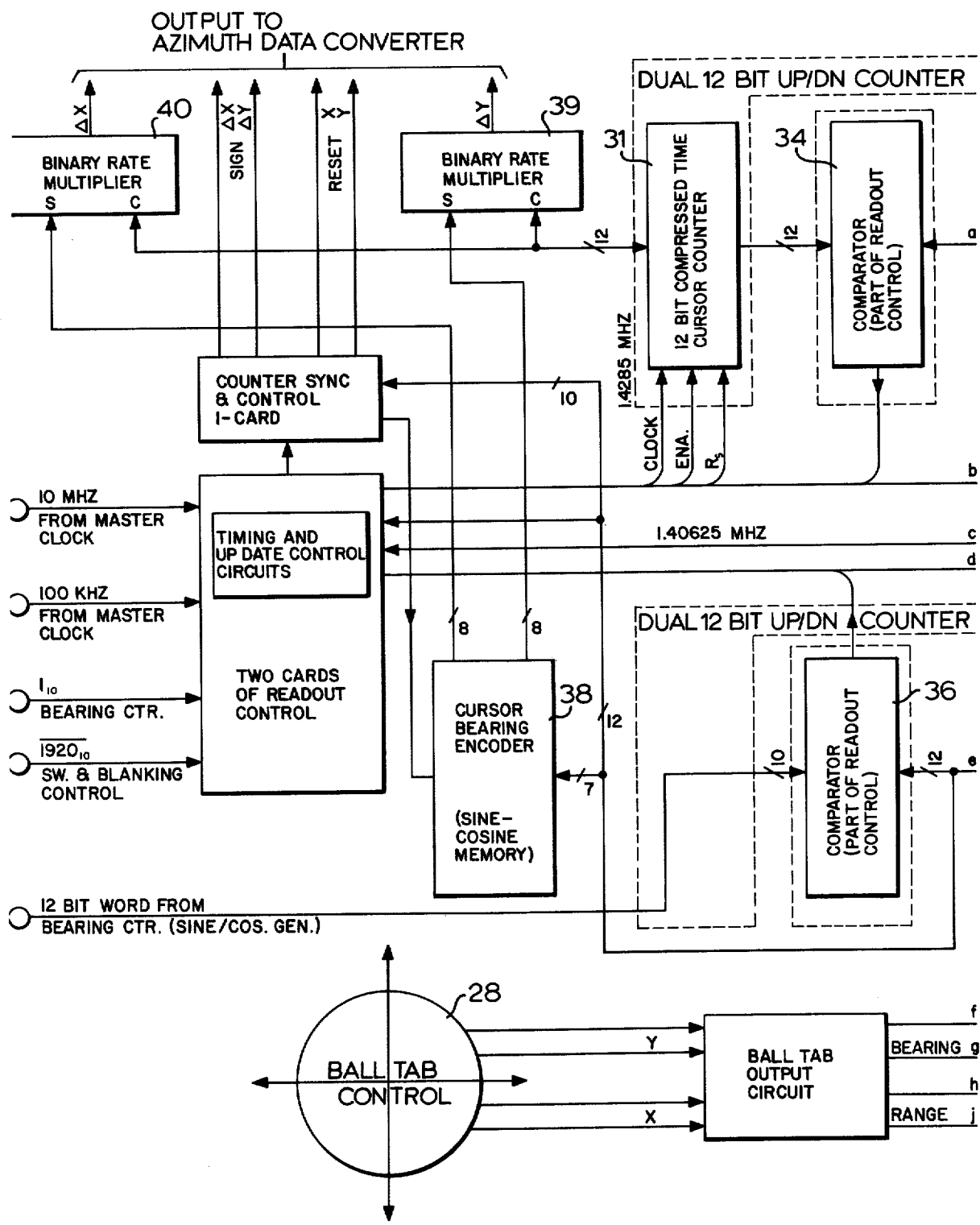
FIGS. 3 and 4 are block diagrams in greater detail of portions of the system shown in FIG. 1.
Figure 4:
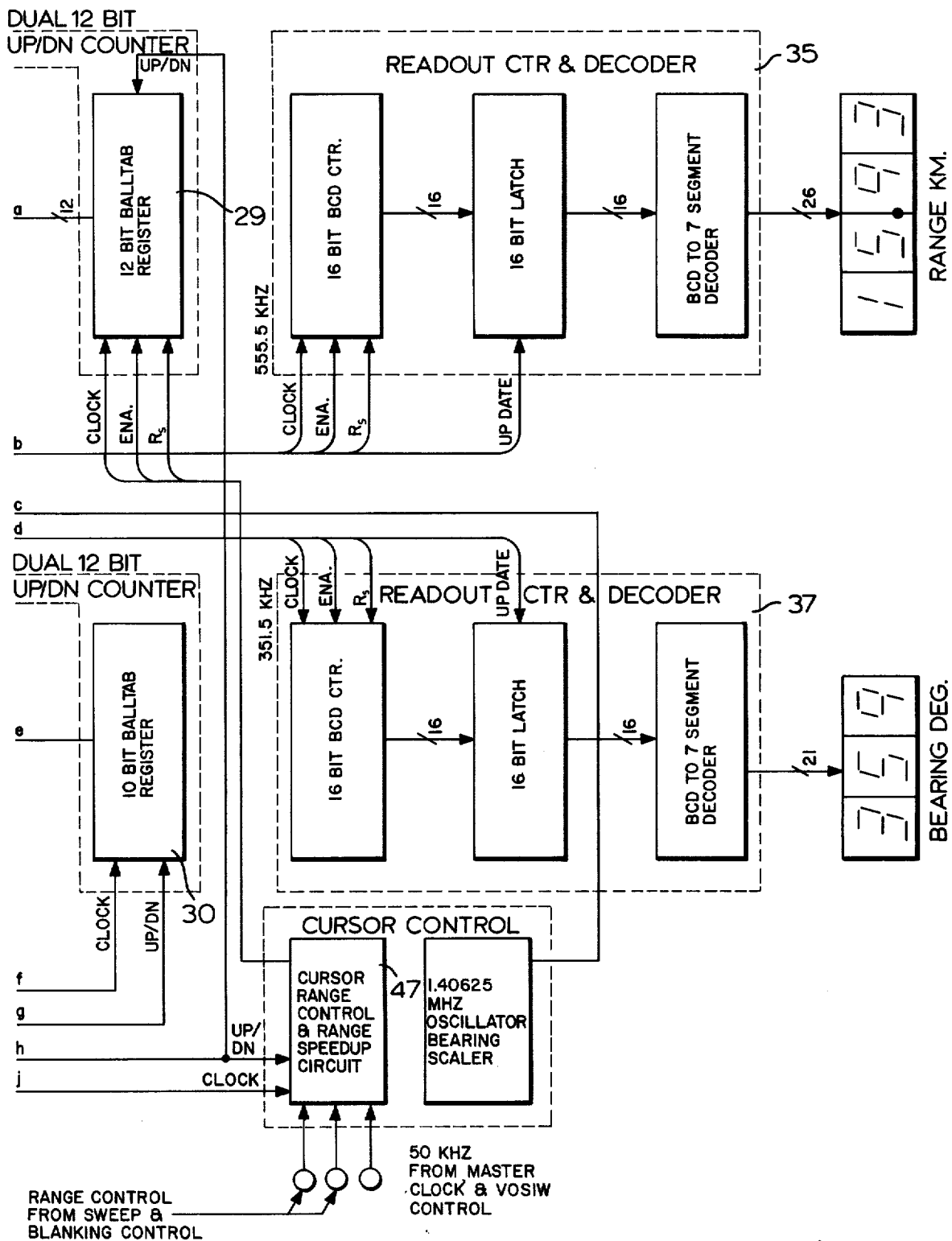

The operation of the cursor generator may be described in association with FIG. 1 but attention is also directed to FIGS. 3 and 4 where portions of the generator are illustrated in greater detail and in corresponding elements bear corresponding designations.

The ball tab 28 produces pulses in accordance with the rotation of the ball under the control of the operator. For example rotation of the ball away from or towards the operator will change the range of the cursor that is the length of the line displayed on the PPI display tube. Transverse rotation of the ball will change the angular position of the line of the PPI display and in this manner the operator may cause the cursor to coincide in direction and length with the echo under consideration. The ball tab produces an output as a series of pulses, one output being the range pulse output and the other being the bearing or angular pulse output. In order to cause the cursor to increase or decrease or change its direction in one angular direction or the other it is necessary that in addition to the pulse outputs there be an output which indicates whether the pulse produced should be added or subtracted to those already produced, that is an up/down indication. Further, to make it easier to change the range a circuit is provided which increases the number of pulses in accordance with the rate of production of pulses, thus making the forward to back operation of the ball tab control non-linear in its rate of pulse output. This function is provided by the cursor range control and range speed up circuit designated 47 on FIG. 4. This output from the ball tab output circuit and the cursor range control speed up circuit is applied to the 12 bit register 29 designated the range register in FIG. 1. The number held in this register will be representative of the number of pulses produced by the range control speed up circuit including the information as to whether the pulses should be added or subtracted from the number already in the register which is determined by the up down signal from the ball tab output. At the same time the cursor range counter 31 is receiving clock pulses from the master clock. When the count in the cursor counter 31 and the number in the 12 bit register 29 are identical this produces an output from the comparator 34 which enables the range readout 35 to produce a visible output on the range display which is an alpha-numeric type of display energized by the range readout information. It will be evident that in order that the number contained in the counter 31 at the time of coincidence be displayed it must be applied to some coding circuit which will convert the digital count to a decimal code suitable for driving an alpha-numeric display. Such a display normally would be a seven segment display, that is a display having seven segments for each digit. As a result at the time of coincidence, the information to be displayed to indicate the range of the target is coded into decimal information and then converted into information suitable for driving the seven segment four digit display.

The bearing information from the ball tab control goes to a bearing register 30 and this is compared with the bearing counter output in the comparator 36. When these two are identical the bearing readout circuit 37, including decoders similar to those provided in the range readout circuit, provides an output to a digital readout. The comparator also enables the sine-cosine read only memory which produces a pair of digital counts representative of the sine and cosine values at the time of coincidence. The outputs from the read only memory 38 are applied to the multipliers 41 and 42 which are also provided with the digital count representative of the count on the cursor counter which increases until coincidence is reached by comparator 34. The result of multiplying these two values together in each case is a count representing a saw-tooth wave form having an amplitude and slope dependent upon the desired location of the cursor as determined by the ball tab output. These counts are accumulated in the ΔY and ΔX counters 41 and 42. The resulting counts are adjusted in the range dividers circuits 21 and 22 to coincide with the range representations from the azimuth generator.

Video System

Considering now FIG. 2 there is shown the video system. This system consists of a coarse video counter 49 and a fine video counter 50, both of which are controlled by the counter control 51. The counter control derives signals selectively either from the comparator 52 or the zero detector 45 depending upon the operation of the true relative switch 48. Outputs from the coarse video counter and the fine video counter are applied to the beam selector 54. The fine video counter also provides a signal to the fine video amplifier 55. The beam selector and the fine video amplifier apply signals to the video control 56, which has an output at terminal 57 which is applied to the Z axis of the display thereby controlling the brightness of the cathode ray tube.

Operation of the Video System

To appreciate the operation of the video system some understanding of the mode of operation of the sonar system is required beyond that necessary to appreciate the display itself. In particular it should be understood that the transmitter energy is sent out simultaneously from the transducers and then the transducers, which consist of a plurality of staves are sequentially and repetitively interrogated to determine whether any pulses have returned. The sequential interrogation of the staves and the combination of their outputs produces, in effect, a lobe of sensitivity which is rotated about the ship the lobe being formed by the proper inter-relation of the energy received at various staves. The various staves are interrogated by means of the beam selector 54. In order that the beams selector shall cause, in effect, a rotation of the lobe or beam about the ship the beam selector must be driven by a count and this count related to the display.

The coarse video counter 49 is therefore driven by a pulse train on terminal 46 derived from the master clock 11. A zero count always results in the beam selector interrogating the number one beam which views the first 30° as shown *a* in FIG. 6. In order that this shall be correlated to the diaplay, a signal is derived from counter 12 in FIG. 1 on terminal 43, which corresponds to terminal 43 in FIG. 2, which represents the count.

This signal is applied to the zero detector 45 and if the true relative switch is in the relative position detection of the zero count causes the counter control 51 to reset counters 49 and 50 to zero. The result is, as illustrated at *a* in FIG. 6, the number one beam is displayed at the top of the display.

If on the other hand the true relative switch is in its other position the count on terminal 43 is compared to the count on terminal 44 by comparator 52. When the two are equal the output activates counter control 51 which resets counters 49 and 50. The signal on terminal 44 is a count representing the compass position. Suitable systems are currently available for converting a compass position to a digital readout. The compass setting is compared to the counter output in comparator 52. When the two are equal and the true relative switch is in the "true" position the output from the comparator is applied to the counter control 51. At equality the counter control resets counter 49 and 50 producing a display as shown at *b* in FIG. 6 with the compass north of the display oriented to the top.

The result of the interrogation of the staves by the beam selector will be a signal extending over 30° in the display. In order to display this information more accurately the staves can be utilized in an additional manner. To this end the fine video counter activates staves in a particular manner but only in response to positioning of the cursor. It will be noted that the fine video counter has an input at terminal 53 from the angle register of the cursor. The fine video counter counts on from a time position represented by the value of the angle register output. During this period the phase relationship between the signals received by the staves is compared in such a way as to determine much more precisely the direction of the return signal, by means of comparing the relative phase of two or more staves. The time position of the returns from the reflection to these specific staves is utilized to produce an angular representation of direction of the reflector. This information is then supplied to the fine video amplifier 55 which causes a brightening of the raster on several sequential sweeps at that particular angular relationship, thus producing a fine video signal as shown on FIG. 6 by means of applying this bright up signal to the video control 56. In this way the specific angular direction of the reflector within a 30 degree angle indentified by the cursor will be displayed as a brightening caused by energization of the Z axis through terminal 57. By accurately locating the cursor over the fine video signal the angular direction of the reflector can be read out from the angular readout 37.

Figure 5:
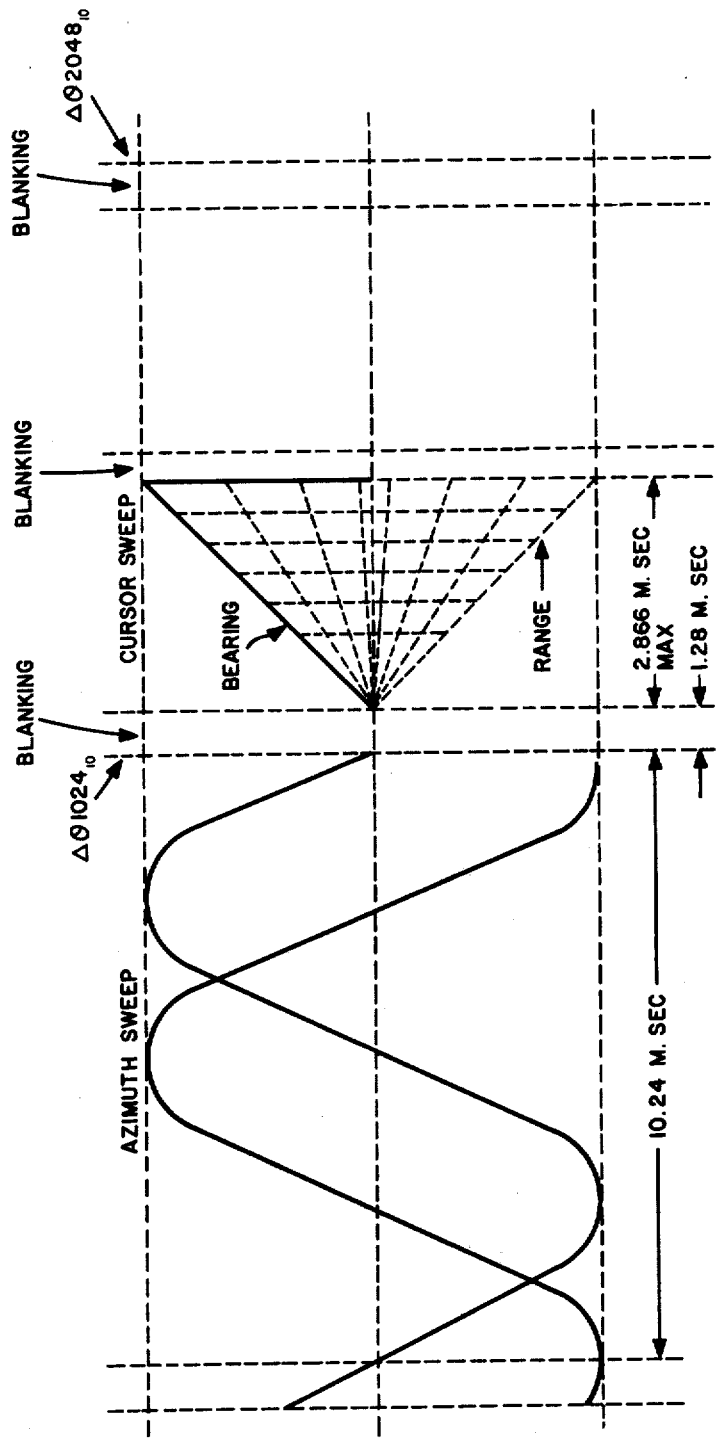
FIG. 5 is a series of wave forms useful in explaining the operation of the system.

It will be seen from FIG. 5 that the wave forms applied to the deflection circuits of the cathode ray tube consist of two essentially different parts. These wave forms, which appear on terminals 25 and 26 consist of a sine and a cosine wave generated by the azimuth generator followed by a pair of saw-tooth waves generated by the cursor generator. The time multiplexing of these two wave forms, one produced by the azimuth generator and the other by the cursor generator for each coordinate axis of the cathode ray tube is accomplished in the range divide circuits 21 and 22. It will be seen that each range divide circuit is supplied with two inputs, a count input from the azimuth generator and a count input from the cursor generator. Each range divide circuit is also provided with two control inputs, one from the range control circuit which determines the display maximum range and one from the master clock. The latter control determines which of the two inputs shall be used to produce the output. For each complete cycle of the system the output from the azimuth generator is used for half the time and the output from the cursor generator used for the other half. As will be seen however the cursor wave form only occupies a fraction of its half of the cycle time. It will be understood therefore that the deflection of the cathode ray tube consists of the following sequence. First a circular deflection of small diameter representing the zero range. Next a radial deflection from the centre to a point determined by the position of the ball tab and in a direction determined by the position of the ball tab representing the cursor. Then the next sequential circle representing a discretly greater radius and range then the initial circle, and so on, alternately displaying the cursor and the circular scan. When a signal is received by the staves of the transducer the signal causes a brightening of the circular scan for the time interval representing 30° and in the direction determined by the phasing of the video interrogation of the staves, thus producing a bright up of one portion of one of the circular traces representing a reflection in a particular direction. The location of the cursor within the same angular position as the return signal causes further interrogation of the staves in such a manner as to produce a fine video signal, that is a signal representative more accurately of the direction of the return. This fine video signal causes sequential brightening of a very narrow portion of the next sequential circular trace and for several traces thereafter in such a way as to produce an elongation of the brightened area in the direction representative of the accurately determined direction of the reflection. The beam of the cathode ray tube is also brightened up during the generation of the cursor so that the cursor can be visually located. By locating the cursor over the fine video bright up the angular location of the echo can be read out. By adjusting the length of the cursor to correspond to the position of the echo the range can similarly be read out.

The embodiments of the invention in which an exclusive property or priviledge is claimed are as follows:

1. In a plan position information display system, a master clock source of pulses of a fixed frequency, a variable clock source of pulses of a frequency adjustable in accordance with a variable ambient condition, a read only memory for producing a cyclically variable digital output function when driven by the count of the pulses from said master clock, a digital multiplier for multiplying the digital output from said read only memory with the digital value of the pulses produced by said variable clock and a digital to analogue converter which converts the digital output from said multiplier into an analogue value for deflecting the beam of a cathode ray tube in accordance with the digital output from said multiplier.

2. A system as claimed in claim 1 wherein said cyclically variable function is a sinusoid.

* * * * *